UNITED STATES PATENT OFFICE.

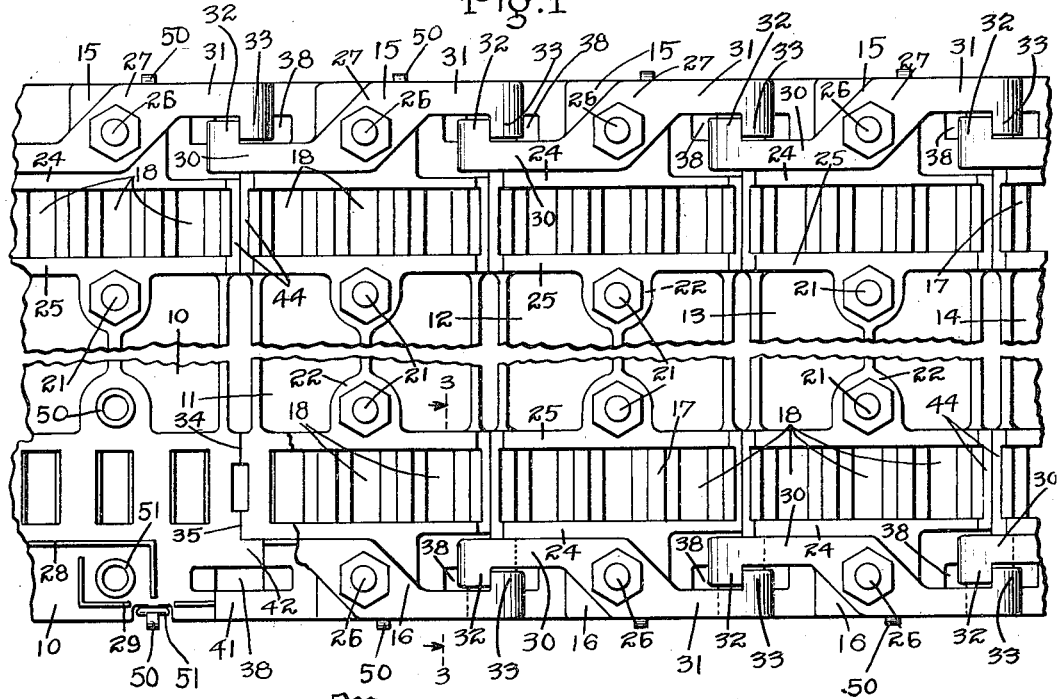

CARL F. NELSON, OF MINNEAPOLIS, MINNESOTA, ASSIGNOR TO TOM THUMB TRACTOR COMPANY, OF MINNEAPOLIS, MINNESOTA, A CORPORATION.

TRACTION-BELT.

1,235,915.

Specification of Letters Patent.

Patented Aug. 7, 1917.

Application filed May 1, 1916. Serial No. 94,624.

*To all whom it may concern:*

Be it known that I, CARL F. NELSON, a citizen of the United States, residing at Minneapolis, in the county of Hennepin and State of Minnesota, have invented certain new and useful Improvements in Traction-Belts, of which the following is a specification.

My invention relates to traction belts for what are known as the caterpillar type of traction engine and has for its object to provide such a belt which shall be constructed of a plurality of slats connected by a corresponding number of hooked members, said members having projecting lugs with sockets for engagement with the teeth of sprocket wheels. By this means the belt is driven directly through the hooked members, which transmit the stresses to each of the successive slats of the belt, thus eliminating the loosening of fastenings and insuring a rigid and substantial structure. A further object is to construct the hooked members with curved surfaces of contact so that as the belt passes over the sprocket wheels these surfaces roll on each other, permitting easy movement of the members.

The full objects and advantages of my invention will appear in connection with the detailed description thereof and are particularly pointed out in the claims.

In the drawings, illustrating the application of my invention in one form,—

Figure 1 is a plan view of an outstretched portion of my improved caterpillar belt with some parts removed. Fig. 2 is a side elevational view of the belt drawn in Fig. 1, part of which is shown to pass about one of the drive sprockets and is shown in section. Fig. 3 is a fragmentary sectional view taken on line 3—3 of Fig. 1.

My improved caterpillar belt, as best shown in Fig. 1, comprises a number of transverse slats 10, 11, 12, 13 and 14. These slats are provided at their ends with castings 15 and 16 by means of which the slats are hingedly linked together for bending in one direction in a manner to be presently described. Castings 15 and 16 are provided with treads 17 in which are positioned a number of sockets 18 which pass directly through the tread and the slat itself. In Figs. 2 and 3 the belt is shown in connection with a sprocket wheel 20, having teeth 19, which teeth engage the respective sockets 18 in the treads 17. These teeth are made small enough so that any dirt which may accumulate in said sprockets may be easily forced out of them by said teeth as the sprocket wheel engages the belt. To further aid in eliminating the friction due to dirt between the plates and the sprocket wheel the tread 17 is depressed in the center at 23 to form two runways 24 and 25 upon which the sprocket wheel rim rides. Castings 15 and 16 are secured to the slats by means of a countersunk bolt 21 which passes through said slat and a lug 22 formed integral with the tread, and also by means of a bolt 26 which passes through said slat and through a thickened portion 27 of the castings at the outer edge thereof. A pair of ridges 28 and 29 and a pair of annular bosses 50 and 51 are formed on the upper surface of the slats at each end thereof and fit into corresponding pairs of depressions in the under sides of the castings 15 and 16. By these means the castings are securely held in place upon the slats and are restrained from any movement relative thereto.

Each of the castings 15 and 16 is provided with a pair of wing members 30 and 31 which issue from the thickened portions 27 of said castings and are offset in opposite directions from the bolts 26. These wings are provided at their extreme ends with hook members 32 and 33 engaging each other at their surfaces 36 and 37, which surfaces extend in line with the edges of the respective slats. The slats are cut away in a number of places at the edges thereof so that in the outstretched position of the belt the said edges are only in direct contact over short surfaces at 34 and 35, as best seen in Fig. 1, permitting the dirt to be squeezed out. In the same position of the belt the hook members 32 and 33 are in mutual contact along the surfaces 36 and 37. The hooks 32 and 33 extend below the upper surfaces of the slats into recesses 38 formed at the edges of the corresponding adjoining slats, and said extended hook portions have rounded edges 39 and 40 which roll on each other as the belt bends. The rolling occurs at the pitch line of the sprocket wheel and in this manner the belt is equally well driven whether it is subjected to tensile or compressive stresses, and said belt is furthermore held from motion in one direction, thereby presenting a rigid surface engaging the ground.

To prevent the slats from sliding apart in a line parallel with the surfaces 36 and 37, a device, best shown in Figs. 1 and 2, is used. At the edge of each slat immediately below the wing members 30 and 31 a portion of the metal of the slat is cut away and complemental lugs 41 and 42 formed on the adjacent slat members. These lugs, as best shown in Fig. 2, may engage the lower edge of the overhanging portions of the wing members 30 and 31 and prevent the slats from sliding apart, thus effectively interlocking each slat with the next one. To permit the belt to bend properly the extreme portions of the wing members 30 and 31 are beveled at 43 and approach the adjacent slats at these portions, when the belt passes over the minimum size sprocket wheels. Similarly, the treads 17 are beveled at 44, which beveled surfaces meet when the belt passes over the smallest size pulley. The most practical angle for cutting either of these bevels is shown in Fig. 2 in connection with slats 11 and 12. The surface 43 is so formed that it does not engage the slat 12 when the belt passes over the sprocket wheel so that the dirt which may get between the slats and these surfaces does not have to be entirely crushed out.

An effective ground-engaging device is shown in the drawings in conjunction with my belt. At the end of each of the slats 10, 11, etc., is formed a hook member 50 over which may be placed a chain 51 extending across the bottom of each slat. When the pieces 15 and 16 are bolted in place they engage the tops of hooks 50, as shown in dotted lines in Fig. 3, and prevent the chains from coming out. Such a device can easily be removed or exchanged and is very effective in muddy ground.

I claim:

1. A traction belt for caterpillar-type traction engines comprising a plurality of transverse slats, means for interlocking the slats and permitting the belt to bend in one direction, said interlocking means being provided with lug-receiving sockets, and a driving wheel having a plurality of lugs for engaging in the sockets and driving the belt.

2. A traction belt for caterpillar-type traction engines comprising a plurality of transverse slats, hooked members secured to the ends of said slats for interlocking the slats and permitting the belt to bend in one direction, treads formed integral with said hooked members, said treads being provided with lug-receiving sockets, and driving wheels having a plurality of lugs for engaging in the sockets and driving the belt.

3. A traction belt for caterpillar-type traction engines comprising a plurality of transverse slats, hooked members secured to the ends of said slats for interlocking the slats and permitting the belt to bend in one direction, treads formed integral with said hooked members, there being lug-receiving sockets extending through said treads and said slats, and driving wheels having a plurality of lugs for engaging in the sockets and driving the belt.

4. A traction belt for caterpillar-type traction engines comprising a plurality of transverse slats, hooked members secured to the ends of said slats, said members having flat engaging surfaces for preventing the belt from bending in one direction, and curved engaging surfaces for permitting rolling movement between the slats when the belt bends in the other direction, and means for driving the belt.

5. A traction belt for caterpillar-type traction engines comprising a plurality of transverse slats, means for interlocking the slats and permitting the belt to bend in one direction, treads formed with said interlocking means having a depressed central portion provided with lug-receiving sockets, and driving wheels each having a plurality of lugs engaging said sockets, and a rim riding on the outer raised portions of said tread.

6. A traction belt for caterpillar-type traction engines comprising a plurality of transverse slats, treads on said slats adapted to be engaged by a sprocket wheel, and means for interlocking the slats and permitting the belt to bend in one direction including a pair of rolling surfaces situated at the pitch line of the sprocket wheel.

7. A traction belt for caterpillar-type traction engines comprising a plurality of slats, hooked members on the ends of said slats, chains secured under said slats on said hooked members, and a plurality of interlocking blocks bolted on said slats and covering said hooked members to hold the chains in place.

In testimony whereof I affix my signature in presence of two witnesses.

CARL F. NELSON.

Witnesses:
F. A. WHITELEY,
H. A. BOWMAN.